July 29, 1941.    L. H. LOGUE    2,250,806

TRANSMISSION DRIVE

Original Filed May 6, 1935

INVENTOR.
LELAND H. LOGUE

BY Rollandet, McGrew & Campbell
ATTORNEYS.

Patented July 29, 1941

2,250,806

UNITED STATES PATENT OFFICE 2,250,806

TRANSMISSION DRIVE

Leland H. Logue, Denver, Colo., assignor to Mining Process and Patent Company, Denver, Colo., a corporation of Delaware Original application May 6, 1935, Serial No. 20,016. Divided and this application November 25, 1938, Serial No. 242,336

2 Claims. (Cl. 74—223)

This invention relates to power transmission and more particularly to driving a plurality of impellers in a flotation machine from a single prime mover.

In performing the froth flotation process, it is customary to use a tank divided by suitable partitions into a series of cells, and to provide a rotary impeller for agitating material under treatment in each such cell.

It is an object of the present invention to provide a transmission by means of which a plurality of impellers, usually four in number, are driven from a single motor through the intermediary of belts.

By so doing, power consumption is reduced without decreasing impeller speed, and substantial savings are also effected in installation, maintenance and operating costs.

To afford a better understanding of the present invention, which is divisional of my co-pending application, Serial No. 20,016, filed May 6, 1935 for Transmission drive, Patent No. 2,162,624 of June 13, 1939 reference is made to the accompanying drawing in the several views of which like parts are designated similarly and in which.

Figure 1:
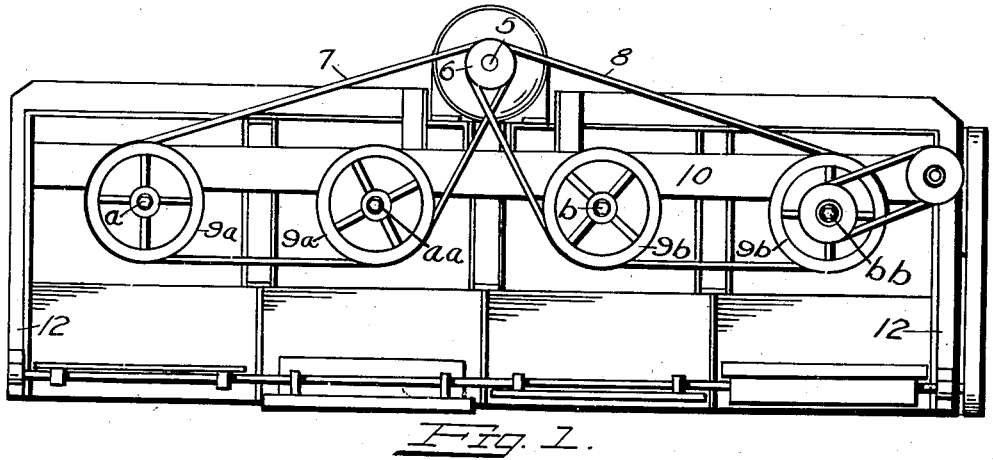
Figure 1 is a top plan view of a four-cell flotation machine provided with the improved belt drive.

In the drawing, the reference numeral 4 designates a motor and in the position illustrated, the drive shaft 5 thereof is vertical. This shaft carries a pulley 6 of the multi-groove type, in this instance, four grooves in number.

The four shafts of the driven members, i. e. impellers, have been designated respectively $a$, $aa$ and $b$, $bb$. Shafts $a$ and $aa$ each carry a pulley 9a, located in substantially the same plane, and provided with two V-shaped grooves, to receive V-shaped driving belts 7 extending from pulley 6.

Figure 2:
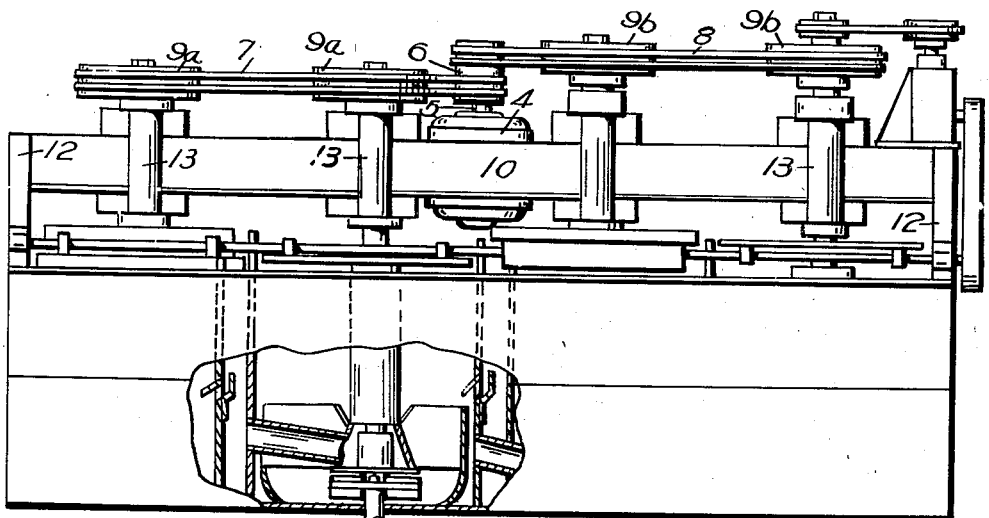
Figure 2 is a side elevation of the machine of Figure 1, with parts broken away to show the interior construction.
Figure 3:
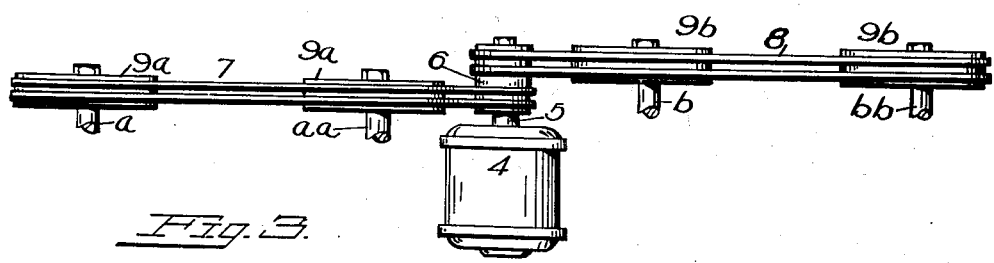
Figure 3 is a side elevation of the transmission drive per se, drawn to an enlarged scale.

Shafts $b$ and $bb$ are each provided with a pulley 9b of the same shape and arrangement as pulleys 9a and have grooves for belts 8, which cooperate with the V-shaped grooves on the drive pulley. As best seen in Figure 2 the pulleys 9b are located in substantially the same plane and slightly above pulleys 9a for the purpose of aligning the grooves with the cooperating grooves of the drive pulley.

It will be seen from Figure 1 that with the pulleys and belts arranged as shown, the several pulleys will be rotated in the same direction by a single prime mover. In the drawing the several driven pulleys have been shown as all of the same size, but of course, this is not essential as the size is selected so as to obtain a given speed of rotation for each impeller. Where the drive is applied to flotation machines, as a rule the pulleys will be of uniform size as the speed of rotation in each cell is the same, except in unusual cases.

In the form of the invention shown in the drawing, the two pair of pulleys 9a and 9b are independent so that either belt 7 or 8 can be removed without affecting the operation of the other pair.

Since the present invention is intended for application to flotation machines generally, of the mechanical agitation type, the well-known "Denver Sub-A" machine has been illustrated as typical of this class. This machine has a superstructure 10 mounted on supports 12 to which bearings 13 are fastened with the shafts $a$, $aa$, $b$ and $bb$ mounted for rotation therein.

The motor 4 is located midway between the two shafts $aa$ and $b$. This symmetrical relation permits use of belts that are of uniform length and thus interchangeable.

The belt transmission shown employs a plurality of V-shaped driving belts cooperating with multi-grooved pulleys, but throughout the specification, the term "belt" will be used to designate any number of belts or the like, which function as a single belt.

With the arrangement illustrated, one motor will operate four flotation impellers, and it is possible to increase the number of driven members by providing additional belts and pulleys although four driven members are believed to be the optimum member to be operated by the single motor.

This arrangement of belt drive transmission makes it possible to effect a substantial reduction in the number of motors in a given milling operation and since the motor requirements represent a considerable less expense than individual motors satisfying the same horsepower requirements, a substantial economy is effected.

From the foregoing description, it will be apparent that the invention resides in the operation of adjoining driven members, disposed in lengthwise alinement in different pluralities, from a single prime mover, and by having pulleys of uniform diameter on such driven members and a uniform spacing of the respective pluralities from the prime mover, synchronous rotation of the driven members is attained.

Synchronism in operation is further assured by having the pulleys of a given plurality and the associated portions of the motor shaft pulley in the same horizontal plane. Thus, even when operating at high speed under heavy loads, no appreciable slippage results and uniformity of movement is attained.

Changes and modifications may be availed of within the spirit and scope of the invention as defined in the hereunto appended claims.

What I claim and desire to secure by Letters Patent is:

1. A transmission drive comprising four driven members disposed at uniform intervals in lengthwise alinement and having pulleys of uniform diameter, a driving member disposed laterally of said row in spaced relation midway between the inner members thereof, and driving connections of substantially uniform length between the driving member and different pluralities of the row, each plurality comprising an outer member and the next adjoining inner member of the row.

2. A transmission drive comprising four driven members disposed at uniform intervals in lengthwise alinement, a driving member disposed laterally of said row in spaced relation midway between the inner members thereof, driving connections of substantially uniform length between the driving member and different pluralities of the row, each plurality comprising an outer member and the next adjoining inner member of the row, and pulleys on the driven members of each plurality and on the driving member positioned in the same horizontal plane.

LELAND H. LOGUE.